US011942242B2

(12) United States Patent
Yasuda et al.

(10) Patent No.: US 11,942,242 B2
(45) Date of Patent: Mar. 26, 2024

(54) WIRING MEMBER

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventors: Suguru Yasuda, Mie (JP); Haruka Nakano, Mie (JP); Motohiro Yokoi, Mie (JP); Kenta Ito, Mie (JP); Hiroki Hirai, Mie (JP); Makoto Higashikozono, Mie (JP); Koichiro Goto, Mie (JP); Junichi Shirakawa, Mie (JP); Yoshitaka Kami, Osaka (JP); Yasushi Nomura, Osaka (JP); Sofia Barillaro, Osaka (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/441,586

(22) PCT Filed: Mar. 29, 2019

(86) PCT No.: PCT/JP2019/014080
§ 371 (c)(1),
(2) Date: Sep. 21, 2021

(87) PCT Pub. No.: WO2020/202275
PCT Pub. Date: Oct. 8, 2020

(65) Prior Publication Data
US 2022/0199290 A1 Jun. 23, 2022

(51) Int. Cl.
*H01B 7/36* (2006.01)
*H01B 7/08* (2006.01)

(52) U.S. Cl.
CPC .......... *H01B 7/365* (2013.01); *H01B 7/0838* (2013.01)

(58) Field of Classification Search
CPC ... H01B 7/02; H01B 7/04; H01B 7/06; H01B 7/08; H01B 7/36; H01B 7/0045;
(Continued)

(56) References Cited

U.S. PATENT DOCUMENTS 3,764,727 A * 10/1973 Balde .................... C08G 69/24 174/117 FF
4,767,891 A * 8/1988 Biegon ............... H01B 7/0876 174/72 A
(Continued)

FOREIGN PATENT DOCUMENTS

CN 101529534 9/2009
CN 103688432 3/2014
(Continued)

OTHER PUBLICATIONS

International Search Report issued in International Pat. Appl. No. PCT/JP2019/014080, dated Jun. 18, 2019, along with an English translation thereof.
(Continued)

*Primary Examiner* — William H. Mayo, III
(74) *Attorney, Agent, or Firm* — Greenblum & Bernstein, P.L.C.

(57) ABSTRACT

A wiring member includes a wiring body and a pattern. The wiring body includes a plurality of wire-like transmission members and a base material. The plurality of wire-like transmission members are fixed to the base material in an aligned state, and the pattern is provided on the wiring body.
(Continued)

The pattern makes a two-dimensional position of at least a part of a portion related to the base material recognizable in the wiring body.

7 Claims, 3 Drawing Sheets

(58) Field of Classification Search
CPC . H01B 11/02; H01B 7/00; H02G 1/06; H02G 3/03; H02G 3/38
USPC ...... 174/110 R, 113 R, 117 R, 117 F, 117 FF
See application file for complete search history.

(56) References Cited

U.S. PATENT DOCUMENTS

| | | | | |
|---|---|---|---|---|
| 5,142,105 | A * | 8/1992 | Kihlken | H01B 13/341 174/72 A |
| 5,357,058 | A * | 10/1994 | Tanihira | H01B 7/0838 174/117 F |
| 10,867,721 | B2 | 12/2020 | Ishida et al. | |
| 2003/0102148 | A1 * | 6/2003 | Ohara | H01B 7/08 174/117 F |
| 2006/0166523 | A1 * | 7/2006 | Bartholomaeus | H01R 13/631 439/67 |
| 2008/0149364 | A1 * | 6/2008 | Lutsch | H01B 7/0823 174/117 FF |
| 2010/0294533 | A1 | 11/2010 | Yagi et al. | |
| 2014/0165392 | A1 | 6/2014 | Toyama et al. | |
| 2014/0332267 | A1 * | 11/2014 | Tanaka | H01B 13/01254 72/370.26 |
| 2016/0019998 | A1 * | 1/2016 | Kawaguchi | H01B 13/01281 174/72 A |
| 2017/0110219 | A1 * | 4/2017 | Tanaka | B32B 27/36 |

FOREIGN PATENT DOCUMENTS

| | | | |
|---|---|---|---|
| CN | 204230234 | 3/2015 | |
| JP | 2002-056722 | 2/2002 | |
| JP | 2002-056722 A * | 2/2002 | H01B 7/08 |
| JP | 2002-110292 | 4/2002 | |
| JP | 2004-74954 | 3/2004 | |
| JP | 2015-215180 | 12/2015 | |
| JP | 2016-095955 | 5/2016 | |
| JP | 2018-137208 | 8/2018 | |

OTHER PUBLICATIONS

International Preliminary Report on Patentability issued in International Pat. Appl. No. PCT/JP2019/014080, dated Sep. 30, 2021, along with an English translation thereof.
Office Action issued in Corresponding JP Patent Application No. 2020-065876, dated Jan. 24, 2023, along with an English translation thereof.
Office Action issued in Corresponding CN Patent Application No. 201980094618.X, dated Dec. 5, 2022, along with an English translation thereof.
Office Action issued in Corresponding CN Patent Application No. 201980094618.X, dated Sep. 27, 2023, along with an English translation thereof.
Office Action issued in corresponding CN Patent Application No. 201980094618.X, dated Jan. 12, 2024, along with an English translation thereof.

* cited by examiner

WIRING MEMBER

TECHNICAL FIELD

The present disclosure relates to a wiring member.

BACKGROUND ART

Patent Document 1 discloses a wire harness including a functional exterior member formed in a sheet shape, and an electrical wire disposed to overlap the functional exterior member in at least a partial region along a longitudinal direction, and at least a part of a portion in which an insulation covering of the electrical wire and the functional exterior member overlap is welded together.

PRIOR ART DOCUMENTS

Patent Documents

Patent Document 1: Japanese Patent Application Laid-Open No. 2018-137208

SUMMARY

Problem to be Solved by the Invention

By the way, there is a demand for automation in a work of assembling a wiring member such as the wire harness described in Patent Document 1 in a vehicle or the like. In automatically assembling the wiring member in the vehicle or the like, it is necessary to recognize a predetermined position in the wiring member, in some cases.

For example, to recognize a predetermined position in the wire harness described in Patent Document 1, it is conceivable to recognize an outer edge portion of the functional exterior member. In a case where the color of the functional exterior member is similar to the color of the background, however, it is difficult to recognize the outer edge portion of the functional exterior member.

Therefore, an object is to provide a technique capable of easily recognizing a predetermined position in a wiring member.

Means to Solve the Problem

A wiring member in the present disclosure is a wiring member including: a wiring body; and a pattern, in which the wiring body includes a plurality of wire-like transmission members, and a base material, the plurality of wire-like transmission members are fixed to the base material in an aligned state, and the pattern is provided on the wiring body, and makes a two-dimensional position of at least a part of a portion related to the base material recognizable in the wiring body.

Effects of the Invention

According to the present disclosure, a predetermined position in the wiring member is easily recognizable.

DESCRIPTION OF EMBODIMENTS

Figure 1:
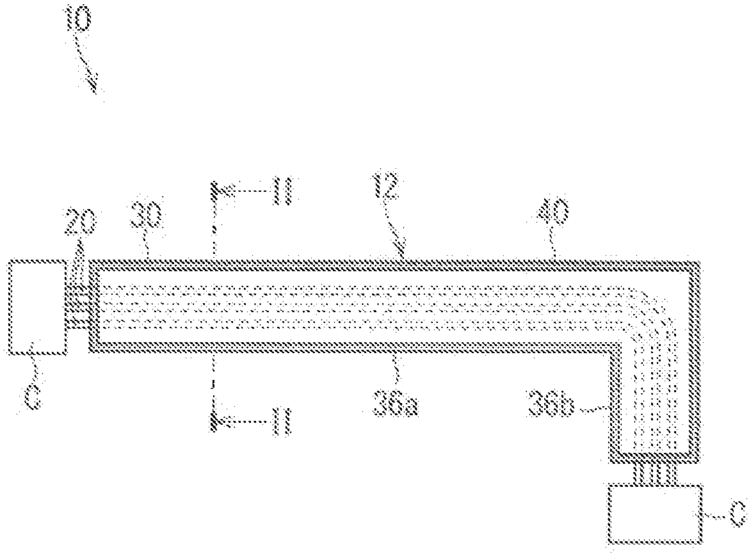
FIG. 1 is a plan view illustrating a wiring member according to a first embodiment.

[Description of Embodiments of the Present Disclosure]

First, embodiments of the present disclosure will be listed and described.

A wiring member in the present disclosure is as follows.

(1) A wiring member includes: a wiring body; and a pattern, in which the wiring body includes a plurality of wire-like transmission members, and a base material, the plurality of wire-like transmission members are fixed to the base material in an aligned state, and the pattern is provided on the wiring body, and makes a two-dimensional position of at least a part of a portion related to the base material recognizable in the wiring body.

The pattern provided on the wiring body facilitates recognition of a predetermined position in the wiring member. Here, the wire-like transmission member is a wire-like member that transmits electricity, light, or the like.

(2) It is considered that the pattern includes an outer edge portion recognition pattern, and the outer edge portion recognition pattern is formed in such a manner that a color of an outer edge portion in the base material is different from a color of an intermediate portion in the base material. In this case, a contrast is easily generated between the outer edge portion and the intermediate portion of the base material, and the outer edge portion of the base material is easily recognized.

(3) It is considered that the pattern includes a characteristic portion, and the characteristic portion exhibits an appearance that does not coincide with another part in the wiring body. In this case, by recognizing the characteristic portion, the portion in which the characteristic portion is provided is easily recognized.

(4) It is considered that the characteristic portion includes a shape specific portion, and the shape specific portion is a portion formed in such a manner that a shape of a part is different from a shape of another part, in a shape of the base material. In this case, the characteristic portion can be formed with the shape of the base material.

(5) It is considered that the characteristic portion includes a path specific portion, the path specific portion is a part formed in such a manner that an appearance of a path of a part is different from an appearance of a path of another part, in paths of the wire-like transmission members in the base material. In this case, the characteristic portion can be formed with the appearance of the path of the wire-like transmission member.

(6) It is considered that the characteristic portion includes marking, and the marking is applied onto a part of a surface in the base material. In this case, the characteristic portion can be formed with marking on the base material.

(7) It is considered that the base material includes a sheet material and a cover, the wire-like transmission members are fixed to the sheet material, and the cover is formed to be higher in rigidity than the sheet material, is fixed to the sheet material, and covers the wire-like transmission members. In this case, since the rigidity of the wiring member is increased by the cover, the wiring member easily maintains a constant shape. Therefore, by recognizing the position of a part in the base material using the pattern, any position in the base material is easily grasped.

[Details of Embodiments of the Present Disclosure]

Specific examples of a wiring member in the present disclosure will be described below with reference to the drawings. Note that the present invention is not limited to these examples, but is indicated by the claims, and is intended to include meanings equivalent to the claims and all modifications within the scope.

First Embodiment

Figure 2:
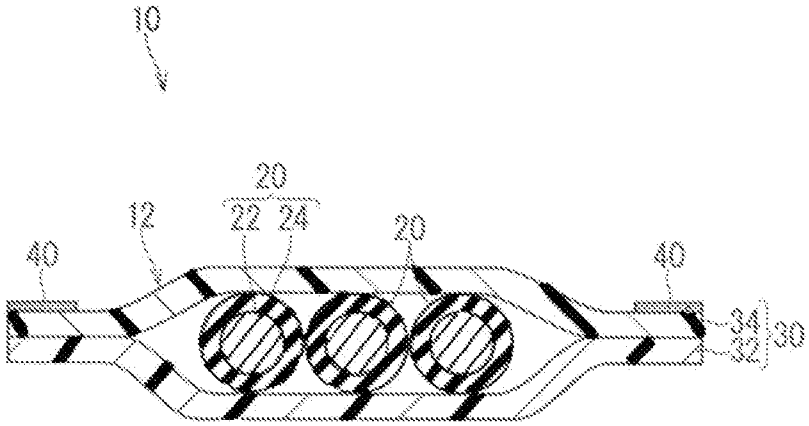
FIG. 2 is a cross-sectional view taken along line II-II of FIG. 1.

Hereinafter, a wiring member according to a first embodiment will be described. FIG. 1 is a plan view illustrating a wiring member 10 according to the first embodiment. FIG. 2 is a cross-sectional view taken along line II-II of FIG. 1. Note that, in FIGS. 1 and 2, in order to facilitate understanding of the difference in color made by a pattern 40 in a base material 30, sand hatching is partially applied.

The wiring member 10 includes a wiring body 12, and a pattern 40 provided on the wiring body 12.

The wiring body 12 is a member to be mounted on a vehicle, supplies the electric power to each piece of equipment of the vehicle, and exchanges signals. The wiring body 12 includes a plurality of wire-like transmission members 20 and the base material 30. The wiring body 12 is formed to be flat.

The wire-like transmission member 20 may be any wire-like member that transmits electricity, light, or the like. For example, the wire-like transmission member 20 may be a common electrical wire having a core wire and a covering around the core wire, or may be a shield wire, a twisted wire, an enameled wire, a nichrome wire, a bare electrical wire, an optical fiber, or the like.

The wire-like transmission members 20 that transmit electricity may be various signal lines or various electric power lines. The wire-like transmission members 20 that transmit electricity may be used as an antenna, a coil, or the like that transmits and receives signals or the electric power to and from space.

In the example illustrated in FIG. 2, the wire-like transmission member 20 includes a transmission wire body 22 that transmits electricity, light, or the like, and a covering 24 that covers the transmission wire body 22. In a case where the wire-like transmission member 20 is a common electrical wire, the transmission wire body 22 is a core wire, and the covering 24 is an insulation covering. In addition, in the example illustrated in FIG. 2, the plurality of wire-like transmission members 20 having the same diameters and structures are disposed in a single base material 30. However, the diameters, the structures, and the like of the plurality of wire-like transmission members 20 may be appropriately set, and the wire-like transmission members 20, which are different in diameter, structure, or the like, may be disposed in the same base material 30.

Further, the wire-like transmission member 20 may be a single wire-like object or a composite of a plurality of wire-like objects (a twisted wire, a cable in which a plurality of wire-like objects are aggregated and covered with a sheath, or the like). At ends of the wire-like transmission members 20, terminals, connectors C, or the like are appropriately provided in accordance with connection forms between the wire-like transmission members 20 and mating members.

The plurality of wire-like transmission members 20 are fixed to the base material 30 in an aligned state. The base material 30 keeps the plurality of wire-like transmission members 20 flat. The base material 30 is a member that holds the wire-like transmission members 20 in a two-dimensionally positioned state. The base material 30 includes a sheet material 32 and a cover 34.

The wire-like transmission members 20 are disposed on a main surface that is one side of the sheet material 32. The sheet material 32 holds the plurality of wire-like transmission members 20 in an aligned state. The sheet material 32 may be a member, while being curved, having rigidity enough to hold planarly positioning the plurality of wire-like transmission members 20, or may be a member, while maintaining a flat state, having rigidity enough to hold two-dimensionally positioning the plurality of wire-like transmission members 20. The sheet material 32 may have a three-dimensional shape part such as a wall partially standing. Here, the sheet material 32 will be described as a bendable member.

The material constituting the sheet material 32 is not particularly limited, but the sheet material 32 is formed of a material containing a resin such as polyvinyl chloride (PVC), polyethylene terephthalate (PET), polypropylene (PP), or the like. The sheet material 32 may be a fiber material having fibers such as a nonwoven fabric, a woven fabric, or a knitted fabric, or may be a non-fiber material. As the non-fiber material, a solid sheet material in which the inside is uniformly embedded, a foamed body obtained by foam-molding a resin, or the like may be applicable. The sheet material 32 may include a material such as metal.

The sheet material 32 may be a single layer or a plurality of layers that are laminated. In a case where the plurality of layers are laminated, for example, it is conceivable that a resin layer and a resin layer are laminated. In addition, for example, it is conceivable that a resin layer and a metal layer are laminated. Further, the sheet material 32 may be formed by stacking a non-fiber material layer and a non-fiber material layer, may be formed by stacking a non-fiber material layer and a fiber material layer, or may be formed by stacking a fiber material layer and a fiber material layer.

The wire-like transmission members 20 are fixed to the sheet material 32 with disposed along a predetermined path on the main surface of the sheet material 32. The sheet material 32 is formed in a belt shape extending along the paths of the wire-like transmission members 20. The paths of the wire-like transmission members 20 on the sheet material 32 may be appropriately set, and the wire-like transmission members 20 may be linearly disposed or may be disposed to bend on the sheet material 32. In a case where the wire-like transmission members 20 are disposed to bend on the sheet material 32, the sheet material 32 may also be formed to bend. The plurality of wire-like transmission members 20 may be disposed in different paths so as to branch or intersect on the sheet material 32. In this case, the sheet material 32 may also be formed to branch or intersect.

In the example illustrated in FIG. 1, the plurality of wire-like transmission members 20 are disposed in a letter L shape that bends in a partway. The sheet material 32 is formed in a letter L shape along the paths of the plurality of wire-like transmission members 20. The sheet material 32 is formed in a shape along the paths of the plurality of wire-like transmission members 20, and thus enables suppression of interference between the sheet material 32 and other components, a reduction in weight, and the like. It is needless to say that the sheet material 32 may not necessarily be formed in a shape along the paths of the plurality of wire-like transmission members 20, and may be formed in another shape such as a square shape.

The wire-like transmission member 20 and the sheet material 32 are fixed with each other. Such a fixing mode may include contact portion fixing or non-contact portion fixing, or both of them may be used in combination. Here, the contact portion fixing denotes that a part in which the wire-like transmission member 20 and the sheet material 32 are in contact with each other is fixed by adhering to each other. In addition, the non-contact portion fixing is a fixing mode in which the contact portion is not fixed. For example, a sewing thread, another sheet material, an adhesive tape, or the like presses the wire-like transmission members 20 toward the sheet material 32, or a sewing thread, another sheet material, an adhesive tape, or the like surrounds the wire-like transmission members 20 and the sheet material 32 to sandwich the wire-like transmission members 20 and the sheet material 32, so as to maintain the wire-like transmission members 20 and the sheet material 32 in a fixed state. In the following, a description will be given assuming that the wire-like transmission members 20 and the sheet material 32 are in a state of the contact portion fixing. Each description regarding the contact portion fixing is also applicable to the non-contact portion fixing, unless the configuration is inapplicable.

As a mode of the contact portion fixing, indirect fixing may be applicable, direct fixing may be applicable, or both may be used in different regions. Here, the indirect fixing denotes that the wire-like transmission member 20 and the sheet material 32 are indirectly adhered and fixed via an intervention member such as an adhesive agent, a sticky agent, a double-sided sticky tape, a surface fastener, or the like that is provided therebetween. In addition, the direct fixing denotes that the wire-like transmission member 20 and the sheet material 32 are directly adhered and fixed without an adhesive agent or the like that is provided separately. In the direct fixing, for example, it is conceivable that a resin contained in at least one of the wire-like transmission member 20 and the sheet material 32 is melted to be adhered and fixed. In the following, a description will be given assuming that the wire-like transmission member 20 and the sheet material 32 are in a state of the direct fixing. Each description related to the direct fixing is also applicable to the indirect fixing, unless the configuration is inapplicable.

For such a state of the direct fixing to be formed, for example, it is conceivable that a resin is melted by heat, or is melted by a solvent. That is to say, the state of the direct fixing may be a state of the direct fixing by heat or a state of the direct fixing by a solvent. The state of the direct fixing by heat is preferable.

The means for forming the state of the direct fixing in this situation is not particularly limited, and various types of means including publicly known types of means such as welding, fusion, bonding, and the like can be used. For example, in a case of forming the state of the direct fixing by heat using welding, various types of welding means such as ultrasonic welding, heat and pressure welding, hot-air welding, and high-frequency welding can be adopted. Further, when the state of the direct fixing is formed by the above means, the wire-like transmission member 20 and the sheet material 32 are in the state of the direct fixing by such a means. Specifically, for example, in a case where the state of the direct fixing is formed by ultrasonic welding, the wire-like transmission member 20 and the sheet material 32 are in the state of the direct fixing by ultrasonic welding. A part in which the state of the direct fixing is formed by heat using the welding (a fixed part between the wire-like transmission member 20 and the sheet material 32) may be referred to as a welded portion, and in the welded portion, a fixed part by ultrasonic welding may be referred to as an ultrasonic welded portion, and a fixed part by heat and pressure welding may be referred to as a heat and pressure welded portion.

In the case of the direct fixing, only a resin contained in the covering 24 of the wire-like transmission member 20 may be melted, or only a resin contained in the sheet material 32 may be melted. In these cases, the melted resin of one of them adheres to the outer surface of the other, and a relatively clear interface may be formed. In addition, in the case of the direct fixing, both the resin contained in the covering 24 of the wire-like transmission member 20 and the resin contained in the sheet material 32 may be melted. In this case, both resins may be mixed together, and a clear interface may not be formed. In particular, in a case where the covering 24 of the wire-like transmission member 20 and the sheet material 32 contain resins that are easily melted together such as the same resin materials, both resins may be mixed together, and a clear interface may not be formed.

The cover 34 is fixed to the sheet material 32. The cover 34 covers the wire-like transmission members 20 from the opposite side to the sheet material 32. The cover 34 is not fixed to the wire-like transmission members 20, but may be fixed thereto.

The sheet material 32 and the cover 34 are fixed together at parts each extending to the sides of the wire-like transmission members 20. As a fixing mode between the sheet material 32 and the cover 34, in the example illustrated in FIG. 2, the direct fixing without use of an intervention material such as an adhesive is illustrated. It is needless to say that the fixing mode between the sheet material 32 and the cover 34 is not limited to the direct fixing, and various types of fixing modes that have been described in the fixing mode between the sheet material 32 and the wire-like transmission member 20 can be used.

The same sheet-shaped members may be used for the sheet material 32 and the cover 34, or different sheet-shaped members may be used. Here, the different sheet-shaped members are used for the sheet material 32 and the cover 34. Here, the sheet-shaped member used for the sheet material 32 is more suitable to be fixed to the wire-like transmission member 20 than the sheet-shaped member used for the cover 34. The sheet-shaped member used for the cover 34 is higher in rigidity and shape maintaining property than those of the sheet-shaped member used for the sheet material 32. For example, the sheet material 32 is a member including a first layer, which is formed of the same material with the covering 24 of the wire-like transmission member 20 in a solid sheet shape, and to which the wire-like transmission member 20 is fixed, and a second layer, which is formed of a nonwoven fabric, and which overlaps the first layer. The cover 34 is a member formed of nylon or the like in a solid sheet shape.

The cover 34 is formed in a similar shape to the sheet material 32, and covers the entirety of the sheet material 32. Therefore, in the base material 30, two belt-shaped parts **36*a* and 36*b* are orthogonal to each other, and are formed in a letter L shape. It is needless to say that the cover 34 may be formed in a shape different from that of the sheet material 32, or may cover a part of the sheet material 32**.

The pattern 40 makes a two-dimensional position of at least a part of a portion related to the base material 30 recognizable in the wiring body 12. The two-dimensional position mentioned here refers to a two-dimensional position of the wiring body 12 (the base material 30) in a plan view, that is, a two-dimensional position when the wiring body 12

(the base material 30) is viewed from a direction orthogonal to the thickness direction. Therefore, the pattern 40 makes the two-dimensional position of at least a part of the portion related to the base material 30 recognizable in the wiring body 12 in a plan view. In addition, the portion related to the base material 30 is not necessarily the base material 30, and may be, for example, a part fixed to the base material 30 in the wire-like transmission member 20. Here, the pattern 40 is provided to be recognizable in a plan view from the cover 34 side. It is needless to say that the pattern 40 may be recognizable in a plan view from the sheet material 32 side. The pattern 40 is provided in the portion related to the base material 30. In the present example, an outer edge portion recognition pattern 40 is formed as the pattern 40.

In the outer edge portion recognition pattern 40, the color of an outer edge portion in the base material 30 is different from the color of an intermediate portion in the base material 30. In the example illustrated in FIG. 2, the outer edge portion recognition pattern 40 is provided by providing marking having a color different from the color of the base material 30, on the surface of the base material 30. The material of such marking is not particularly limited. For example, as the marking, paint may be applied onto the base material 30, or a narrow belt-shaped member having a width narrower than that of the base material 30 may be affixed.

It is needless to say that the outer edge portion recognition pattern 40 is not limited to the marking. For example, in a case where the surface of the cover 34 and the surface of the sheet material 32 have different colors from each other, a protruding portion, in which an outer edge portion of one of the sheet material 32 and the cover 34 protrudes from an outer edge portion of the other, can be used as the outer edge portion recognition pattern 40.

The width dimension of the outer edge portion recognition pattern 40 is not particularly limited, as long as it is recognizable. For example, when the outer edge portion recognition pattern 40 is recognized by using an image process, the width dimension of the outer edge portion recognition pattern 40 is desirably set in consideration of the resolution or the like of an imaging unit. Specifically, in a captured image of the entire base material 30, there are desirably several pixels in the width direction of the outer edge portion recognition pattern 40.

It is preferable that the base material 30 does not have a rotationally symmetric shape in a plan view. That is, the base material 30 is desirably formed in a rotationally asymmetric shape in a plan view. In a case where the base material 30 is formed in the rotationally asymmetric shape in a plan view, there is no combination of rotationally symmetric positions in the base material 30. That is, there is no rotationally symmetric position corresponding to a predetermined position in the base material 30. Consequently, the predetermined position of the base material 30 is easily recognized by recognizing the outer edge portion of the base material 30. It is needless to say that the base material 30 may have a rotationally symmetric shape in a plan view. For example, in a case where a plurality of positions to be rotationally symmetric in the base material 30 are recognized without distinction, the base material 30 may have a rotationally symmetric shape in a plan view.

<Operation>

A description will be given with regard to an operation example of recognizing a predetermined position of the wiring member 10 using the above-described pattern 40. Here, a description will be given with regard to an operation example of recognizing a predetermined position of the wiring member 10 by use of a common image recognition technology.

First, an image of the wiring member 10 is captured from the thickness direction. An image-captured range at this time may be the entirety of the wiring member 10, the entirety of the base material 30, or a part of the portion related to the base material 30 including the pattern 40. For example, in the case where the pattern 40 is the outer edge portion recognition pattern 40, at least the entirety of the base material 30 is desirably set as the image-captured range.

Next, the pattern 40 is recognized in the captured image. The pattern 40 can be recognized, for example, by performing an edge extraction process on the captured image. Specifically, for example, in the case where the pattern 40 is the outer edge portion recognition pattern 40, the contrast is larger between the outer edge portion recognition pattern 40 and the intermediate portion rather than that in the captured image. Therefore, the outer edge portion recognition pattern 40 can be recognized by extracting a part having such a large difference in contrast in the captured image.

Next, the two-dimensional position of the predetermined position related to the base material 30 in the wiring member 10 is recognized by using the pattern 40 that has been recognized. For example, the two-dimensional position of the predetermined position related to the base material 30 in the wiring member 10 can be recognized by performing shape matching by using the pattern that has been recognized. Specifically, in the case where the pattern 40 is the outer edge portion recognition pattern 40, the outer edge portion recognition pattern 40 that has been obtained is compared with data stored beforehand, so that the two-dimensional position of the part of the outer edge portion recognition pattern 40 in the wiring member 10, that is, the two-dimensional position of the outer edge portion of the base material 30 in the wiring member 10 can be recognized. Therefore, the pattern 40 can also be regarded as a material for facilitating detection of the position of at least a part of a portion related to the base material 30 in the wiring member 10, when the shape matching is performed, based on the captured image of the wiring member 10 from the thickness direction.

By recognizing the two-dimensional position of the predetermined position related to the base material 30 in the wiring member 10 in this manner, the position (for example, the position of the connector or the position of a clamp) or the like of a part to be gripped by a robot hand or the like at the time of an assembling work can be specified from two-dimensional position information that has been obtained, and thus an automatic assembling work can be smoothly conducted.

According to the wiring member 10 configured as described above, the pattern 40 formed in the wiring body 12 facilitates recognition of the predetermined position in the wiring member 10. In addition, the outer edge portion recognition pattern 40 is formed as the pattern 40, the contrast is easily generated at the outer edge portion of the base material 30, and the outer edge portion of the base material 30 is easily recognized.

In addition, the rigidity of the wiring member 10 is enhanced by the cover 34, and the shape of the portion related to the base material 30 is easily maintained. Therefore, by recognizing the position of a part in the base material 30 using the pattern 40, any position in the base material 30 is easily grasped.

Second Embodiment

Figure 3:
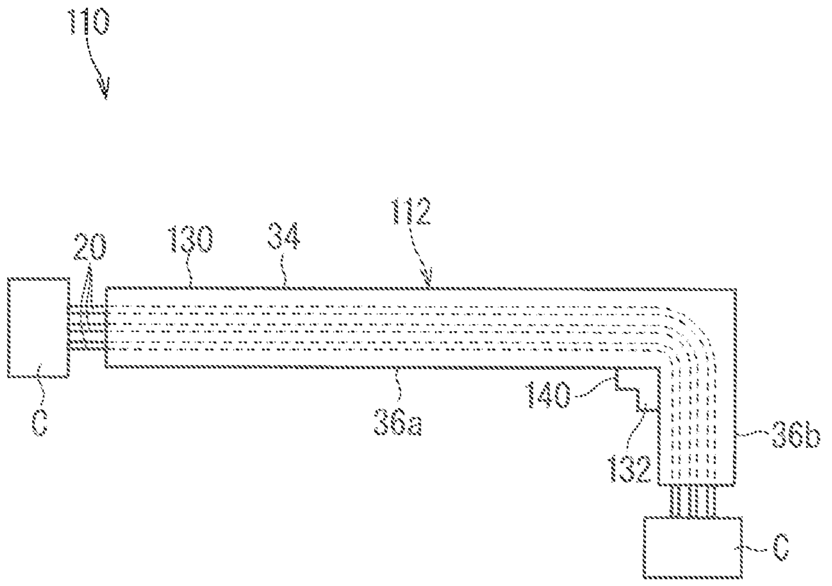
FIG. 3 is a plan view illustrating a wiring member according to a second embodiment.

A wiring member according to a second embodiment will be described. FIG. 3 is a plan view illustrating a wiring member 110 according to the second embodiment. Note that in the description of the present embodiment, the same components as those described above are denoted by the same reference numerals, and the descriptions will be omitted. The same reasoning applies to the following description in each embodiment.

A pattern 140 in a wiring member 110 according to the second embodiment is different from the pattern 40 in the wiring member 10 according to the first embodiment. Specifically, the characteristic portion 140 is provided as the pattern 140. The characteristic portion 140 is a part that exhibits an appearance that does not coincide with another part in the wiring body 12. The outer edge portion recognition pattern 40 recognizes the entirety of the portion related to the base material 30, whereas the characteristic portion 140 recognizes a part of the portion related to a base material 130.

In the present example, the shape specific portion 140 is formed as the characteristic portion 140. The shape specific portion 140 is a part that has been formed in such a manner that the shape of a part is different from the shape of another part, in the shape of the base material 130. Note that, in the example illustrated in FIG. 3, in the shape of a sheet material 132, the shape of a part is formed to be different from the shape of another part to form the shape specific portion 140. It is needless to say that in the shape of the cover 34, the shape a part may be formed to be different from the shape of another part to form the shape specific portion 140.

The position in which the shape specific portion 140 is formed is not particularly limited, and can be formed at any position of the base material 130. Here, the shape specific portion 140 is formed in the outer edge portion of the base material 130. Therefore, in the outer edge portion of the base material 130, the shape of the shape specific portion 140 is formed to be different from the shape of another part. In particular, here, the shape specific portion 140 is formed at a corner portion of the base material 130.

The shape specific portion 140 is formed such that parts each extending from two edge portions constituting the corner portion of the base material 130 are connected with each other. Consequently, it is possible to suppress the shape specific portion 140 from bending to be hidden. More specifically, in the example illustrated in FIG. 3, the shape specific portion 140 is formed at an inner peripheral side portion of the corner portion, in which the belt-shaped part **36*a* and the belt-shaped part 36*b* intersect and bend at the outer edge portion of the base material 130. The shape specific portion 140 is formed such that a part extending from an edge of the belt-shaped part 36*a* and a part extending from an edge of the belt-shaped part 36*b*** are connected with each other.

The shape of the shape specific portion 140 is not particularly limited, and can be formed into any shape, as long as the shape does not coincide with another part. The shape of the shape specific portion 140 is desirably formed in a rotationally asymmetric shape in a plan view. In the example illustrated in FIG. 3, the shape specific portion 140 is formed in a shape in which one corner portion of a square is cut out in a plan view. It can also be regarded that the shape specific portion 140 is formed in a step shape in which corner portions in the same direction are continuous.

The size of the shape specific portion 140 is not particularly limited, as long as it is recognizable. For example, in a case where the shape specific portion 140 is recognized by using the image process, the shape specific portion 140 is desirably set in consideration of the resolution or the like of the imaging unit. For example, the shape specific portion 140 may be formed to have a size equal to or smaller than the width dimension of the base material 130. In addition, the shape specific portion 140 may be formed to have a size equal to or smaller than the dimension in the parallel direction of the plurality of wire-like transmission members 20 (an interval between the two outermost wire-like transmission members 20).

Also in a case where the pattern 140 is the characteristic portion 140, the characteristic portion 140 is recognized by a common image recognition technology, in a similar manner to the operation example that has been described in the first embodiment, so that a predetermined position of the wiring member 110 can be recognized. In this situation, in a case where the pattern 140 is the characteristic portion 140 and the position of the characteristic portion 140 can be analogized to some extent at the time of image-capturing, the entirety of the base material 130 does not have to be set as the image-captured range. It is sufficient if at least a range including the entirety of the characteristic portion 140 is set as the image-captured range.

Also with the wiring member 110, the pattern 140 provided on a wiring body 112 facilitates recognition of a predetermined position in the wiring member 110. According to the wiring member 110, the characteristic portion 140 is provided as the pattern 140. Therefore, recognition of the characteristic portion 140 facilitates recognition of the part in which the characteristic portion 140 is provided. In addition, the shape specific portion 140 is formed as the characteristic portion 140. Therefore, the characteristic portion 140 can be formed by the shape of the base material 130.

Third Embodiment

Figure 4:
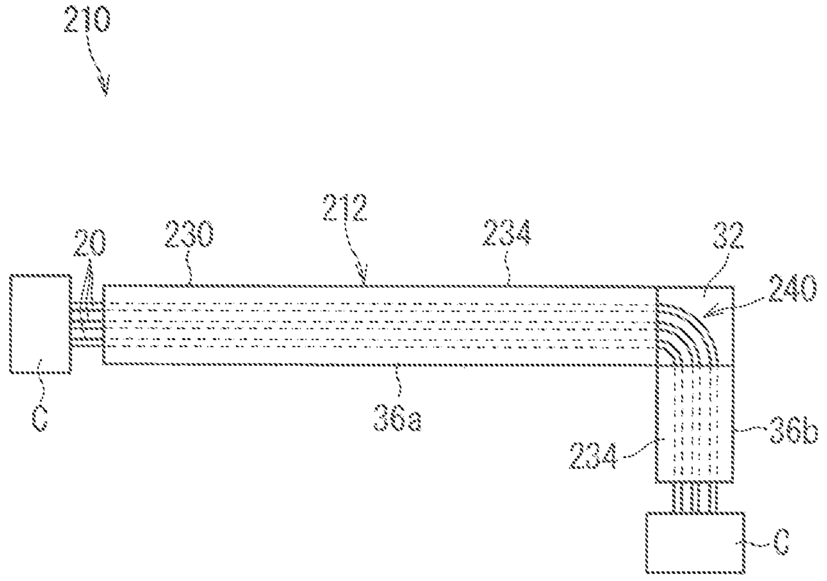
FIG. 4 is a plan view illustrating a wiring member according to a third embodiment.

A wiring member according to a third embodiment will be described. FIG. 4 is a plan view illustrating a wiring member 210 according to a third embodiment.

In the wiring member 210 according to the third embodiment, a characteristic portion 240 is different from the characteristic portion 140 in the wiring member 110 according to the second embodiment. In the present example, the characteristic portion 240 is a path specific portion 240. In the path specific portion 240, in the paths of the wire-like transmission members 20 in a base material 230, the appearance of a part of the path is different from the appearances of the paths of the other parts.

In the paths of the wire-like transmission members 20, a part to be the path specific portion 240 is not particularly limited. Any part can be set, as long as the appearance of the path is different from the appearances of the paths of the other parts. Here, curved parts in the wire-like transmission members 20 correspond to the path specific portion 240. In this situation, a part from a curve-start part to a curve-end part is desirably the path specific portion 240.

In addition, in the path specific portion 240, it is sufficient if the appearance of the path is different, and there may be a part having the same path. For example, also in a case where there are a plurality of curved parts in the wire-like transmission members 20, and only one part is visible and all the other parts are hidden by the cover 34 and are invisible, such a visible part can be set as the path specific portion 240.

Here, there is provided a path recognition support portion that makes the path of the path specific portion 240 stand out more than the paths of the other parts. The path specific portion 240 is not provided with a cover 234, the wire-like transmission members 20 are exposed, whereas the cover 234 is provided in the other parts to serve as path recognition support portions other than the path specific portion 240. The path specific portion 240 may be provided with a transparent cover, and the other parts may be each provided with an opaque cover to form the path recognition support portion. In addition, in a case where there is no cover, the sheet material 32 may have a color different from that of the wire-like transmission members 20 in the path specific portion 240, and the sheet material 32 may have a color similar to those of the wire-like transmission members 20 in the other parts to form the path recognition support portion.

In a case where the characteristic portion 240 is the path specific portion 240, the color of the wire-like transmission members 20 (the color of the coverings 24) and the color of the base material 230 (the color of the sheet material 32, in the example illustrated in FIG. 4) are desirably different from each other. In particular, the color of the wire-like transmission members 20 and the color of the base material 230 may be set to be high in contrast, for example, white and black. Consequently, the path specific portion 240 is easily recognized.

Also with the wiring member 210, the characteristic portion 240 as the pattern 240 formed on a wiring body 212 facilitates recognition of a predetermined position in the wiring member 210. According to the wiring member 210, the characteristic portion 240 can be formed by the paths of the wire-like transmission members 20. Note that in a similar manner to the operation example that has been described in the first embodiment, the path specific portion 240 is recognized by using a common image recognition technology, and a predetermined position of the wiring member 210 can be recognized.

Fourth Embodiment

Figure 5:
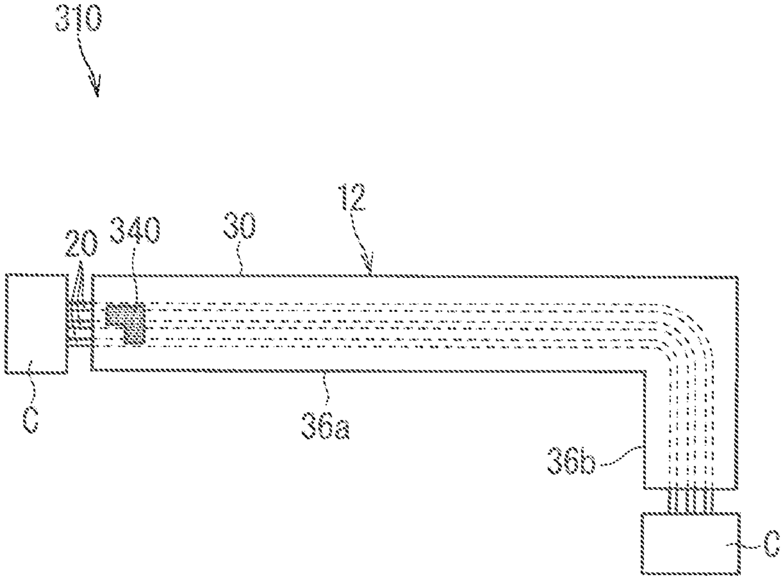
FIG. 5 is a plan view illustrating a wiring member according to a fourth embodiment.

A wiring member according to a fourth embodiment will be described. FIG. 5 is a plan view illustrating a wiring member 310 according to a fourth embodiment. Note that, in FIG. 5, in order to facilitate understanding of the difference in color between the base material 30 and marking 340, sand hatching is partially applied.

In the wiring member 310 according to the fourth embodiment, the characteristic portion 340 is different from the characteristic portions 140 and 240 in the wiring members 110 and 210 according to the second and third embodiments. In the present example, the characteristic portion 340 is the marking 340. The marking 340 is applied onto a part of the surface in the base material 30.

The position in which the marking 340 is applied is not particularly limited, and the marking is applicable to any position of the base material 30. Here, the marking 340 is applied onto an end portion of the base material 30. More specifically, in the example illustrated in FIG. 5, the marking 340 is applied onto an end portion of the belt-shaped part 36*a* on the opposite side to the side intersecting with the belt-shaped part 36*b*, in the base material 30. For example, it is conceivable that the marking 340 is applied onto a part to be kept flat in a direction orthogonal to a plan view, in the base material 30. Consequently, the marking 340 is less likely to tilt, and thus an error in recognition of the marking 340 is less likely to occur. In the example illustrated in FIG. 5, the marking 340 is applied onto a part that covers the wire-like transmission members 20, in the cover 34.

The shape of the marking 340 is not particularly limited, and can be formed in any shape, as long as the shape does not coincide with another part. The marking 340 is preferably formed in a rotationally asymmetric shape in a plan view. In the example illustrated in FIG. 3, the marking 340 is formed in a shape in which one corner portion of a square is cut out in a plan view.

The size of the marking 340 is not particularly limited, as long as it is recognizable. For example, in a case where the marking 340 is recognized using the image process, the size of the marking 340 may be set in consideration of the resolution or the like of the imaging unit. For example, the marking 340 may be formed in a size equal to or smaller than the width dimension of the base material 30. In addition, the marking 340 may be formed to have a size equal to or smaller than the dimension in the parallel direction of the plurality of wire-like transmission members 20 (an interval between the two outer wire-like transmission members 20).

The material of the marking 340 is not particularly limited. For example, as the marking 340, paint may be applied onto the base material 30, or a narrow belt-shaped member having a width narrower than that of the base material 30 may be attached.

Also with the wiring member 310, the characteristic portion 340 as the pattern 340 formed in the wiring body 12 facilitates recognition of a predetermined position in the wiring member 310. According to the wiring member 310, the characteristic portion 340 can be formed by the marking 340 on the base material 30. Note that in a similar manner to the operation example that has been described in the first embodiment, the marking 340 is recognized by using a common image recognition technology, and a predetermined position of the wiring member 310 can be recognized.

[Supplementary Note]

Heretofore, the description has been given that the base material includes the cover in the wiring member, but this is not an essential configuration. The base material may not include the cover, in some cases.

In addition, the description has been given assuming that the wire-like transmission members 20 are fixed on the sheet material as the base material in the wiring body, but this is not an essential configuration. For example, in the wiring body, a linear conductor may be fixed inside the base material. Such a wiring body may be a so-called flexible flat cable (FFC), which is formed by sandwiching a plurality of linear conductors between two films or by extrusion molding a resin material around the plurality of linear conductors.

Further, the description has been given that only a single pattern is formed in a single wiring member, but this is not an essential configuration. A plurality of patterns 40, 140, 240, and 340 may be used in combination in a single wiring member. In this case, the plurality of patterns 40, 140, 240, and 340 are usable in any combination.

Note that the configurations that have been described in the above embodiments and modifications can be appropriately combined, as long as they do not contradict each other.

EXPLANATION OF REFERENCE SIGNS

10, 110, 210, 310: wiring member
12, 112, 212: wiring body
20: wire-like transmission member
22: transmission wire body
24: covering
30, 130, 230: base material
32, 132: sheet material
34, 234: cover
36*a*, 36*b*: belt-shaped part
40: outer edge portion recognition pattern (pattern)
140: shape specific portion (pattern, characteristic portion)

240: path specific portion (pattern, characteristic portion)
340: marking (pattern, characteristic portion)
C: connector

The invention claimed is:

1. A wiring member comprising:

a wiring body; and a pattern, wherein the wiring body includes a plurality of wire-like transmission members, and a base material, the plurality of wire-like transmission members are fixed to the base material in an aligned state, the pattern is provided on the wiring body, and makes a two-dimensional position of at least a part of a portion related to the base material recognizable in the wiring body, the pattern includes an outer edge portion recognition pattern, the outer edge portion recognition pattern is formed such that a color of an outer edge portion in the base material is different from a color of an intermediate portion in the base material, and the outer edge portion recognition pattern is continuously formed along only the outermost edge portion of the base material so as to entirely surround an intermediate portion of the base material in which the outer edge recognition pattern is not provided.

2. A wiring member comprising:

a wiring body; and a pattern, wherein the wiring body includes a plurality of wire-like transmission members, and a base material, the plurality of wire-like transmission members are fixed to the base material in an aligned state, the pattern is provided on the wiring body, and makes a two-dimensional position of at least a part of a portion related to the base material recognizable in the wiring body, the pattern includes a characteristic portion, and the characteristic portion exhibits a unique rotationally asymmetric appearance that does not coincide with another part in the wiring body.

3. The wiring member according to claim 2, wherein the characteristic portion includes a shape specific portion, and the shape specific portion is a portion formed in such a manner that a shape of a part is different from a shape of another part, in a shape of the base material.

4. The wiring member according to claim 2, wherein the characteristic portion includes a path specific portion, and the path specific portion is a part formed in such a manner that an appearance of a path of a part is different from an appearance of a path of another part, in paths of the wire-like transmission members in the base material.

5. The wiring member according to claim 2, wherein the characteristic portion includes marking, and the marking is applied onto a part of a surface in the base material.

6. The wiring member according to claim 1, wherein the base material includes a sheet material and a cover, the wire-like transmission members are fixed to the sheet material, and the cover is formed to be higher in rigidity than the sheet material, is fixed to the sheet material, and covers the wire-like transmission members.

7. The wiring member according to claim 1, wherein a connector is provided at end portions of the plurality of wire-like transmission members that extend outward from an end portion of the base material, and the connector and the base material are spaced apart from each other in a longitudinal direction of the plurality of wire-like transmission members.

* * * * *